(12) United States Patent
Colombo et al.

(10) Patent No.: US 8,468,895 B2
(45) Date of Patent: Jun. 25, 2013

(54) PRESSURE SENSOR DEVICE

(75) Inventors: Paolo Colombo, Alessandria (IT); Domenico Cantarelli, Casale Monferrato (IT); Marco Bigliati, Casale Monferrato (IT); Mauro Zorzetto, Casale Monferrato (IT); Fabio Nebbia, Casale Monferrato (IT); Giorgio Martinengo, Casale Monferrato (IT)

(73) Assignee: ELTEK S.p.A., Casale Monferrato (Alessandria) (IT)

( * ) Notice: Subject to any disclaimer, the term of this patent is extended or adjusted under 35 U.S.C. 154(b) by 88 days.

(21) Appl. No.: 13/000,292

(22) PCT Filed: Jun. 17, 2009

(86) PCT No.: PCT/IB2009/052578
§ 371 (c)(1),
(2), (4) Date: Feb. 25, 2011

(87) PCT Pub. No.: WO2009/153741
PCT Pub. Date: Dec. 23, 2009

(65) Prior Publication Data
US 2011/0138921 A1 Jun. 16, 2011

(30) Foreign Application Priority Data
Jun. 19, 2008 (IT) ............... TO2008A0483

(51) Int. Cl.
*G01L 19/14* (2006.01)
*G01L 19/04* (2006.01)
(52) U.S. Cl.
USPC ............................................ 73/756; 73/715

(58) Field of Classification Search
USPC .................................................... 73/756, 715
See application file for complete search history.

(56) References Cited

U.S. PATENT DOCUMENTS

| 4,767,897 | A | * | 8/1988 | Betterton et al. | ............ 200/83 J |
| 5,410,916 | A |   | 5/1995 | Cook |  |
| 5,587,535 | A | * | 12/1996 | Sasaki et al. | .................... 73/726 |
| 6,131,467 | A | * | 10/2000 | Miyano et al. | .................. 73/756 |

(Continued)

FOREIGN PATENT DOCUMENTS

| EP | 1 376 090 | 1/2004 |
| WO | WO 2008078184 A2 * | 7/2008 |

OTHER PUBLICATIONS

International Search Report for PCT/IB2009/052578, mailed Oct. 2, 2009.

(Continued)

*Primary Examiner* — Lisa Caputo
*Assistant Examiner* — Punam Roy
(74) *Attorney, Agent, or Firm* — Nixon & Vanderhye P.C.

(57) ABSTRACT

A pressure sensor device comprises: —a casing (2a, 3a) defining a cavity (7) with an inlet passage (8a, 8b), —a pressure sensor (30) having a body accommodated in the cavity (7), for detecting the pressure of a fluid present in the inlet passage (8a, 8b), —a circuit arrangement including a circuit support (20) at least partially accommodated in the cavity (7) according to a respective laying plane, the pressure sensor (30) being mounted on the circuit support (20). Associated to the circuit support (20) is a protection body (31) surrounding the pressure sensor (30), the protection body (31) externally defining a seat for positioning a respective seal member (35), in particular a radial seal gasket, intended to cooperate with an internal surface of the casing (2a, 3 *a*).

20 Claims, 12 Drawing Sheets

U.S. PATENT DOCUMENTS

| | | | | |
|---|---|---|---|---|
| 6,142,020 | A * | 11/2000 | Kim et al. | 73/714 |
| 6,186,009 | B1 * | 2/2001 | Miyano et al. | 73/756 |
| 7,036,385 | B2 * | 5/2006 | Murai | 73/756 |
| 7,080,559 | B1 | 7/2006 | Griffin | |
| 7,150,198 | B2 * | 12/2006 | Kaneko et al. | 73/756 |
| 7,240,558 | B2 * | 7/2007 | Ernsberger et al. | 73/719 |
| 7,478,560 | B2 * | 1/2009 | Kuznia et al. | 73/724 |
| 7,663,496 | B2 * | 2/2010 | Kawakami et al. | 340/626 |
| 7,900,520 | B2 * | 3/2011 | Colombo | 73/754 |
| 2003/0140703 | A1 * | 7/2003 | Weigl | 73/715 |
| 2004/0055387 | A1 | 3/2004 | Miyazaki | |
| 2008/0250862 | A1 * | 10/2008 | Nakabayashi | 73/756 |
| 2011/0174080 | A1 * | 7/2011 | Zorzetto et al. | 73/756 |

OTHER PUBLICATIONS

Written Opinion of the International Searching Authority for PCT/IB2009/052578, mailed Oct. 2, 2009.

* cited by examiner

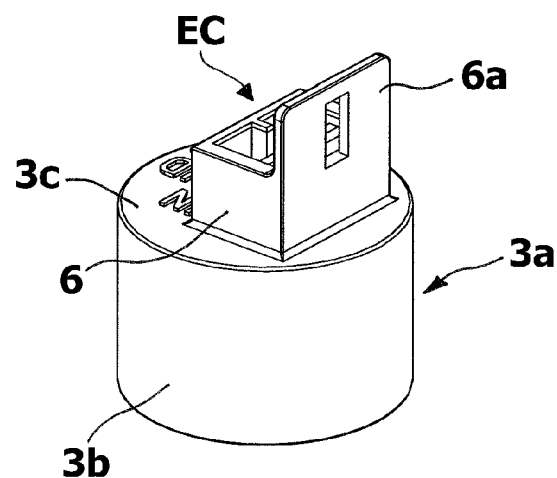
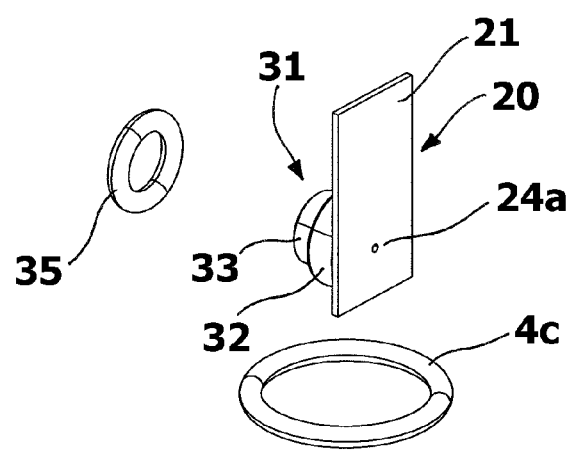
Fig. 13
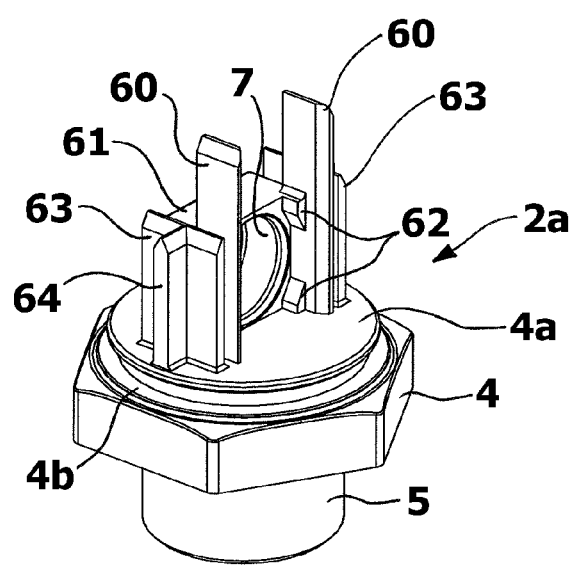

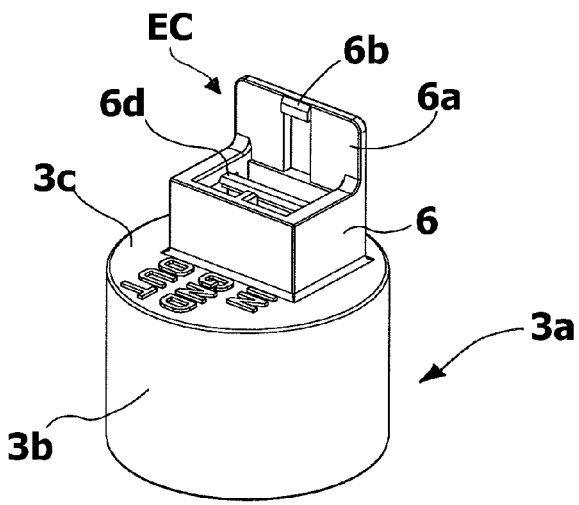
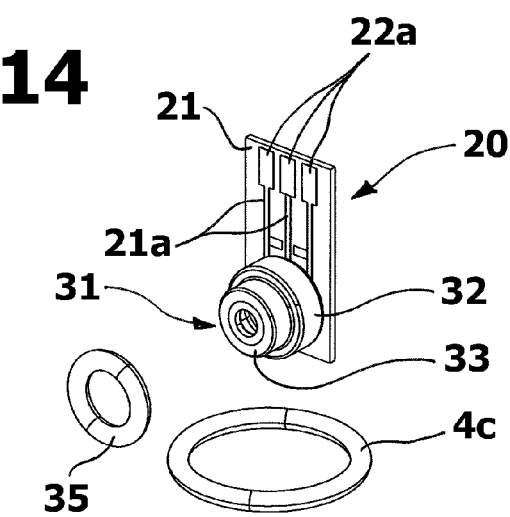
Fig. 14
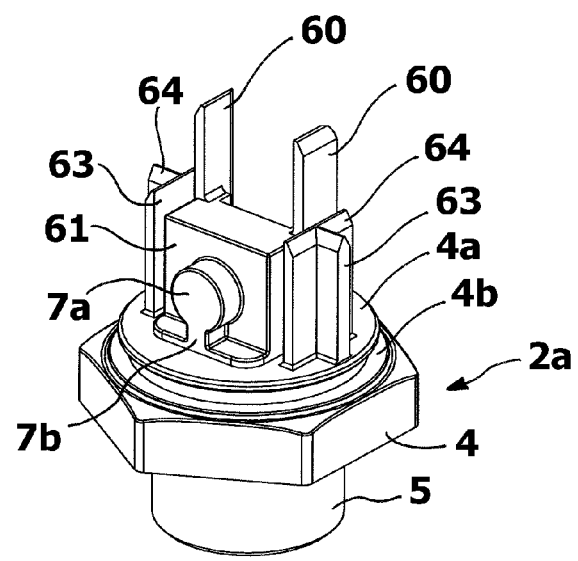

PRESSURE SENSOR DEVICE

This application is the U.S. national phase of International Application No. PCT/IB2009/052578, filed 17 Jun. 2009, which designated the U.S. and claims priority to Italian Application No. TO2008A000483, filed 19 Jun. 2008, the entire contents of each of which are hereby incorporated by reference.

FIELD OF THE INVENTION

The present invention refers to a pressure sensor device.

The invention has a preferred, but not exclusive, application in sensor devices of the type comprising:
- a casing defining a cavity with an inlet passage for a fluid,
- a pressure sensor having a body accommodated in the cavity, for detecting the pressure of the fluid,
- a circuit arrangement including a circuit support at least partially accommodated inside the cavity according to a respective laying plane, the pressure sensor being mounted on the circuit support.

BACKGROUND ART

The known devices of the indicated type have a relatively complex structure, they have reliability problems in the long-term and they are difficult to produce from an industrial point of view. Production of such devices is difficult to automate due to the small dimensions and the inherent delicateness of the interior components, and specifically the pressure sensor and the possible circuit support.

SUMMARY OF THE INVENTION

Generally, the present invention proposes providing a pressure sensor device that is inexpensive to manufacture, easy and accurate to mount as well as reliable in use over time. Another aim of the invention is that of obtaining a sensor device of the indicated type whose assembly may be performed at least partially in an automated manner, without being exposed to the risk of damaging the most delicate components of the device itself while simultaneously guaranteeing the required mounting accuracy.

One or more of these aims are attained, according to the present invention, by a pressure sensor device having the characteristics of the attached claims, which form an integral part of the technical teaching provided herein in relation to the invention.

Generally, the invention relates to a pressure sensor device comprising:
- a casing defining a cavity with an inlet passage for a fluid,
- a pressure sensor having a body accommodated in the cavity, for detecting the pressure of the fluid,
- a circuit arrangement including a circuit support at least partially accommodated in the cavity according to a respective general laying plane, the pressure sensor being mounted on the circuit support.

In an inventive embodiment, associated to the circuit support is a protection body surrounding the pressure sensor, and cooperating for sealing purposes with an internal surface of the casing. Preferably, to this purpose sealing means are provided for between the protection body and the above said internal surface. Again preferably, the protection body externally defines a seat for positioning the seal means, which comprise in particular a seal member, in particular a radial seal gasket.

According to another inventive embodiment the pressure sensor is mounted on a first face of the circuit support, the device comprises a temperature sensor and associated to the circuit support is a protection body surrounding the pressure sensor and at least part of the temperature sensor, the protection body containing a protection material, such as a gel.

According to another inventive embodiment the pressure sensor is at least partially accommodated in a chamber defined in the cavity, where the inlet passage is in communication with the chamber, the casing comprises a first casing part and a second casing part mutually couplable according to a coupling direction to define the cavity therebetween, and the chamber for accommodating the pressure sensor is entirely defined in the first casing part and is extended axially, or in depth, in a direction substantially perpendicular to the first direction and to the laying plane of the circuit support.

According to another inventive embodiment, the pressure sensor is at least partially accommodated in a chamber defined in the cavity, where the inlet passage is in communication with the chamber, the casing comprises a first casing part and a second casing part mutually couplable according to a coupling direction to define the cavity therebetween, and the first and the second part of the casing define respective positioning means configured to maintain the circuit support in the respective laying plane, with a respective portion of the circuit support outside the cavity to provide at least part of an electric connector belonging to the circuit arrangement.

According to another inventive embodiment the circuit arrangement includes an electric connector which comprises connection terminals each having a first portion extended inside the cavity and a second portion extended outside the cavity, wherein the first portion of each terminal defines at least one abutment surface departing from which is a terminal end having a restricted section, particularly generally sharp-pointed, wherein the terminal end is extended axially according to a direction at least approximately perpendicular with respect to the laying plane of the circuit support, wherein the terminal ends having a restricted section are inserted into respective holes present in a first region of the circuit support, with the latter lying on the abutment surfaces, and wherein the casing defines, inside the cavity, positioning means for supporting the circuit support in a second region thereof.

According to another inventive embodiment the circuit support itself defines a connector and the casing is configured to transform such connector into a different type of connector.

These and other independently inventive embodiments described hereinafter may also be combined together, with the aim of obtaining a pressure sensor device which thus, in its practical implementation, may comprise one or more of the characteristics of the independently inventive embodiments.

BRIEF DESCRIPTION OF THE DRAWINGS

Further objects, characteristics and advantages of the present invention shall be apparent from the detailed description that follows and from the attached drawings, strictly provided for exemplifying and non-limiting purposes, wherein:

FIGS. 13, 14 and 15 are exploded views, from different angles, of the device of FIGS. 11 and 12;

DESCRIPTION OF PREFERRED EMBODIMENTS OF THE INVENTION

As a non-limiting example let us suppose that the sensor devices according to the various embodiments described hereinafter are intended for use in vehicles, such as internal combustion engine vehicles, for example in combination with a system for controlling emissions of nitrogen oxides ($NO_x$), or in combination with a fuel supply or injection system for a vehicle or with a lubrication system; in the first case, the fluid subject to pressure measurement may be for example ammonia in aqueous solution or urea, while in the second case the fluid may be a fuel, such as gas oil, or a lubricating oil, such as engine oil. Sensor devices described hereinafter are however suitable for use also in other fields, such as domestic appliances, heating or air conditioning as well as in the hydro-sanitary or heating industry, or water systems in buildings or residential houses, with the aim of detecting the fluid pressure (liquids or aeriform) used in such fields, such as for example water or mixtures of water with other substances (for example water mixed with glycol or any other substance adapted to prevent the liquid in a system or circuit from freezing).

Figure 1:
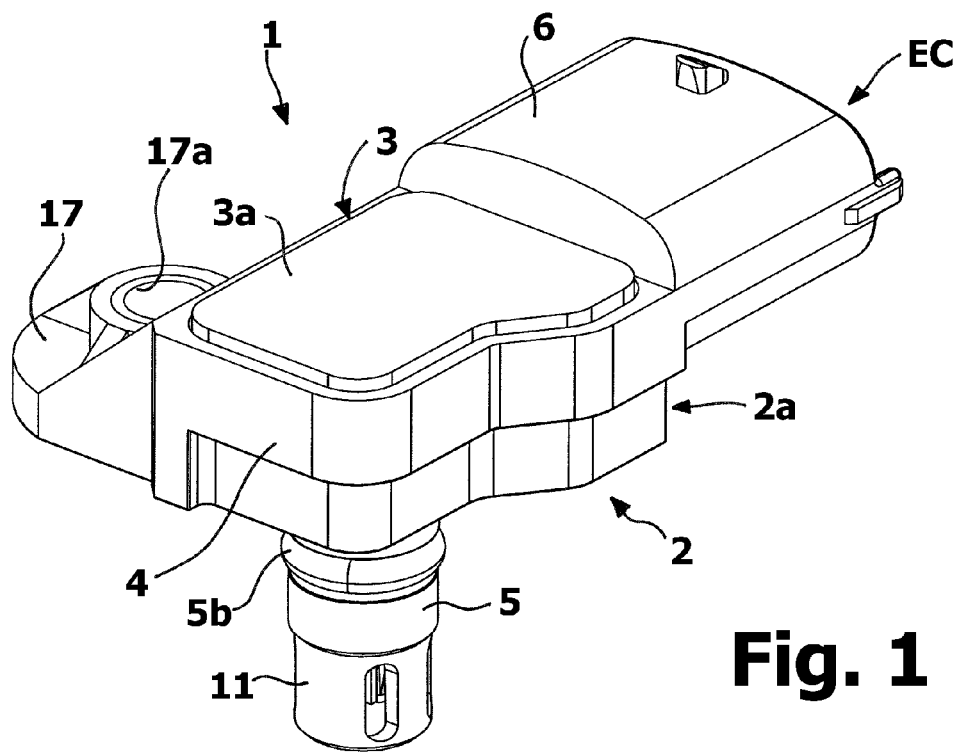
FIGS. 1 and 2 are perspective views, from different angles, of a pressure sensor device according to a first inventive embodiment.
Figure 2:
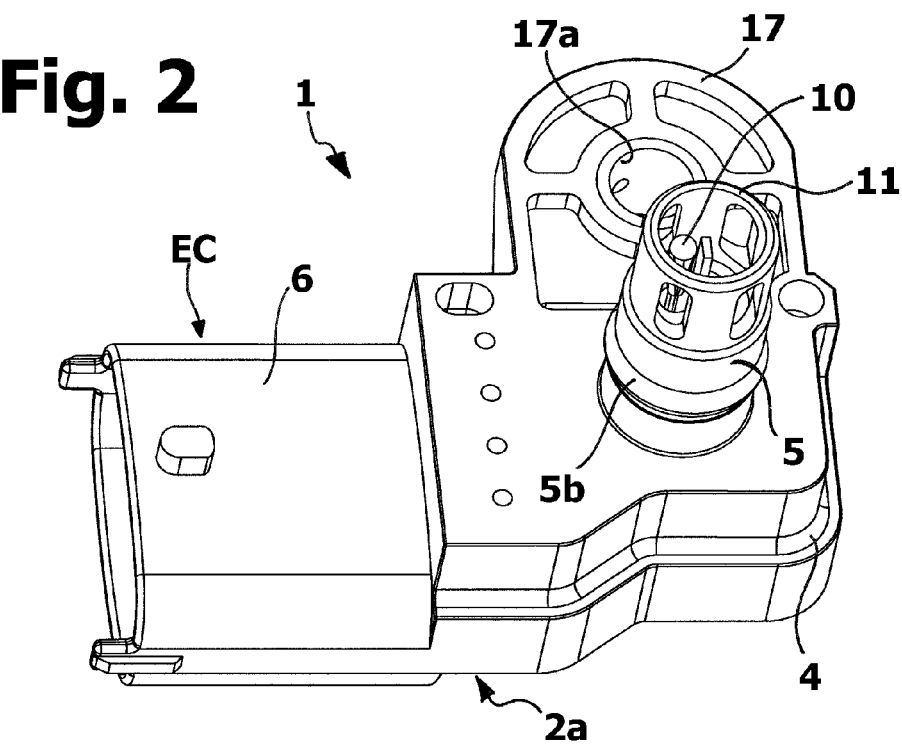

With reference to FIGS. 1 and 2, indicated in its entirety with 1 is a pressure sensor device in first embodiment of the invention, identified in whose structure are two main parts, indicated with 2 and 3 only in FIGS. 1 and 2: part 2 essentially serves accommodation/support, hydraulic connection and electric connection functions, while part 3 essentially serves cover functions. The bodies of the two parts 2 and 3, indicated with 2a and 3a in the figures, are mutually coupled, preferably sealingly, to obtain a casing for internal components of the device 1, as deducible for example from the views of FIGS. 3-4. The bodies 2a and 3a are made using relatively rigid material, such as thermoplastic material, and they are preferably made at least partially through a moulding process.

The body 2a has an intermediate accommodation/support portion 4, a lower connection portion 5 and an essentially tubular lateral or radial portion 6. As observable particularly in FIG. 4, defined in the intermediate portion 4 is a detection cavity or chamber 7, beneath which is the portion 5, essentially configured as a connecting unit. The portion 5 is preferably cylindrical-shaped and defines a seat 5a (FIG. 3) for a radial seal means, represented for example by an o-ring indicated with 5b. The portion 5, which provides an inlet or pressure port of the device 1, is intended to be connected to a hydraulic circuit, not represented, held in which is the fluid whose pressure and temperature, in the embodiment herein, are to be detected.

In the illustrated example the portion 5 is passed through in axial direction by two conduit portions. The first of these conduit is made up of two differently shaped conduit sections, indicated with 8a and 8b in FIG. 5. Section 8a opens at the lower end (with reference to the figures) of the portion 5, while section 8b opens at the bottom of the chamber 7. The second conduit, indicated with 9, is extended axially through the portion 5, also opening at the bottom of the chamber 7. The conduit 9 is intended to accommodate—at least partially—terminals or rheophores of an element sensitive to the fluid temperature: the above-mentioned element sensitive to temperature, hereinafter referred to as "temperature sensor" for simplification purposes and which can for example be a negative temperature coefficient resistor or NTC, is indicated with 10 in the figures, and the respective rheophores are indicated with 10a. As observable in FIG. 5, the main body of the sensor 10 projects slightly from the portion 5: for such purpose, the portion 5 is preferably provided with a tubular terminal appendage 11, for protecting the sensor 10, having a perforated wall.

In the illustrated example the device 1 includes a circuit arrangement comprising an electronic circuit or PCB (Printed Circuit Board) and an external connector, described further ahead. In the example, accommodated inside the chamber 7 is a circuit, such as a printed circuit board indicated in its entirety with 20, having a circuit support mounted on which is a component sensitive to pressure, indicated in its entirety with 30 in FIGS. 4 and 5, and hereinafter referred to as "pressure sensor" for the sake of simplification. The printed circuit board 20 is generally flat-shaped and, in this embodiment, it lies according to a plane substantially parallel to the axis of the portion 5.

The pressure sensor 30 is of the silicon type, for example having a structure made up several parts or layers integral to each other (for example glued or welded); the sensor 30 may comprise a so-called silicon die, having a portion or part configured as a membrane being deformable depending on the pressure to be detected, the die possibly comprising other parts and/or being glued on a respective glass or ceramic substrate, or any other material suitable for the purpose; the die or the assembly of the parts that is made up of is connected and/or applied to the circuit support and/or to the printed circuit board, or made at least partially of the same support or circuit.

The method for making and connecting the sensors of the indicated type are per se known, and thus do not require a detailed description herein.

In the shown example, the region for mounting the sensor 30 onto the circuit 20 is circumscribed by a peripheral protection element 31, substantially annular or tubular shaped, for example made of plastic material. As observable in FIGS. 4-6, also the element 31 is mounted on the circuit 20 and laterally surrounds the sensor 30, slightly spaced therefrom. A protection material, not represented, covering at least the sensor 30 may be advantageously applied in the space delimited by the element 31. This protection material, for example a gel, is preferably of the type resistant to chemical attack (for example a fluoride silica gel) and it is adapted to transmit the pressure of the fluid subject of the measurement to the sensitive element or on the sensor 30, simultaneously insulating it from the fluid.

As mentioned, the device 1 further has an electric connector, indicated in its entirety with EC, which comprises the tubular part 6 of the body 2a, substantially radial or perpendicular with respect to the cavity 7, at least partially extended into which are the terminals for the electric connection of the device 1; some of these terminals are indicated with 12 in the figures. As observable particularly in FIG. 4 or 5, the terminals 12 are generally flat-shaped and are configured in such a manner to have a connection end 12a having a restricted section, and preferably generally sharp-pointed, an intermediate portion with multiple folds, indicated with 12b and a substantially straight end portion 12c. In the example, the terminals 12 are configured in such a manner that the ends 12a are at least approximately perpendicular to the circuit 20 and the portion 6 is substantially radial with respect to the cavity 7. The terminals 12 are made of electrically conductive material, for example a metal such as copper, or an alloy.

In the illustrated example the material that forms the body 2a is a synthetic material, particularly a thermoplastic material, which is overmoulded to the terminals 12, the latter for example being obtained through a blanking process from a metal strip and/or deforming or moulding process and/or mechanical machining or turning process. As observable in FIG. 5, the overmoulding is performed such that the end portion 12c of the terminals 12 is extended—for the most part—into the tubular portion 6, to obtain a connector EC for electric connection of the device therewith. The end portion 12a of the terminals 12 is on the contrary extended into the chamber 7, so as to provide an electric contact, for direct connection with the circuit 20. As observable in FIG. 3, defined in the region of the terminal from which the restricted end sections 12a depart is at least one abutment or support surface 12a'.

Figure 3:
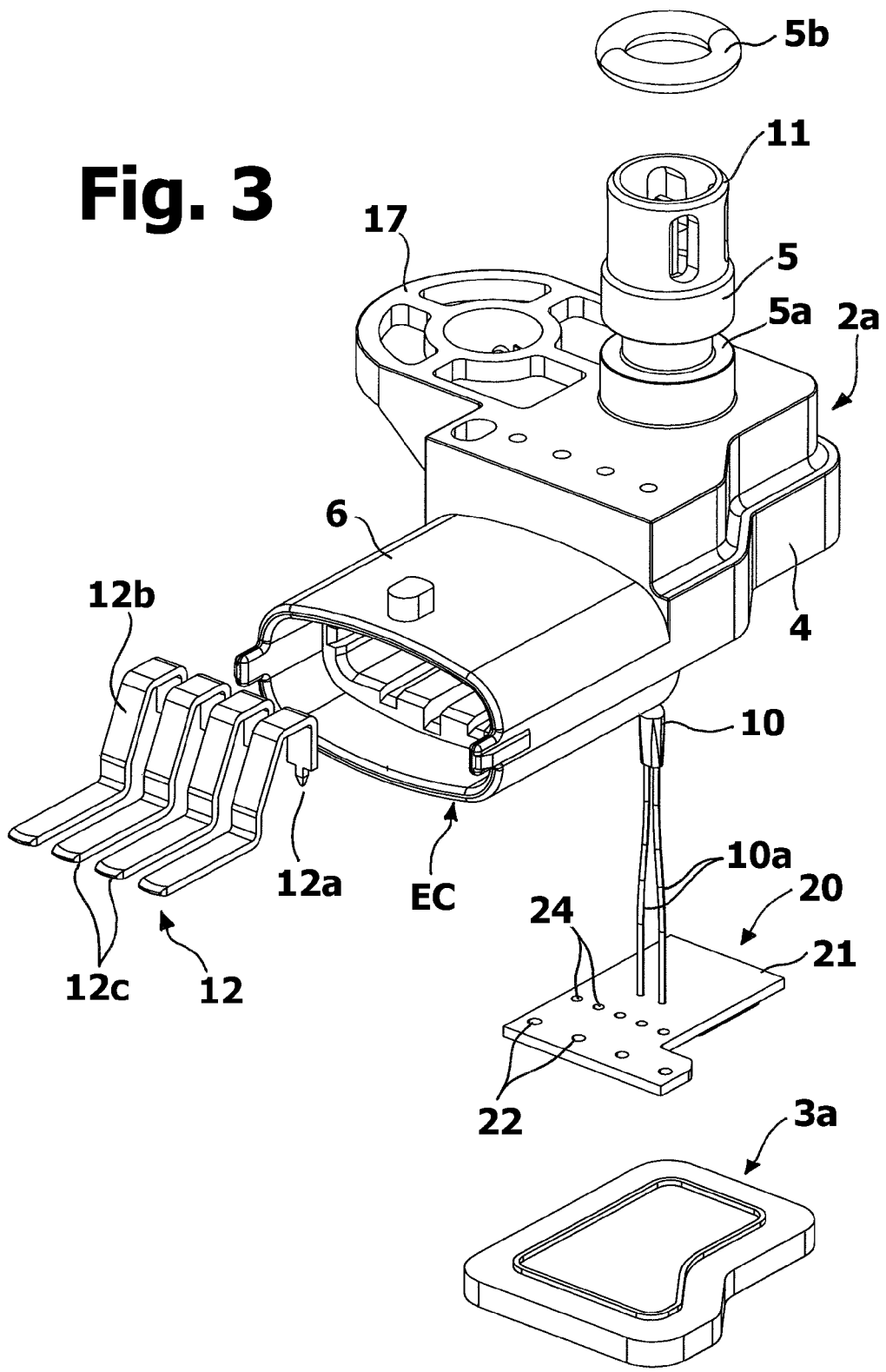
FIGS. 3 and 4 are exploded views, from different angles, of the device of FIGS. 1 and 2.
Figure 4:
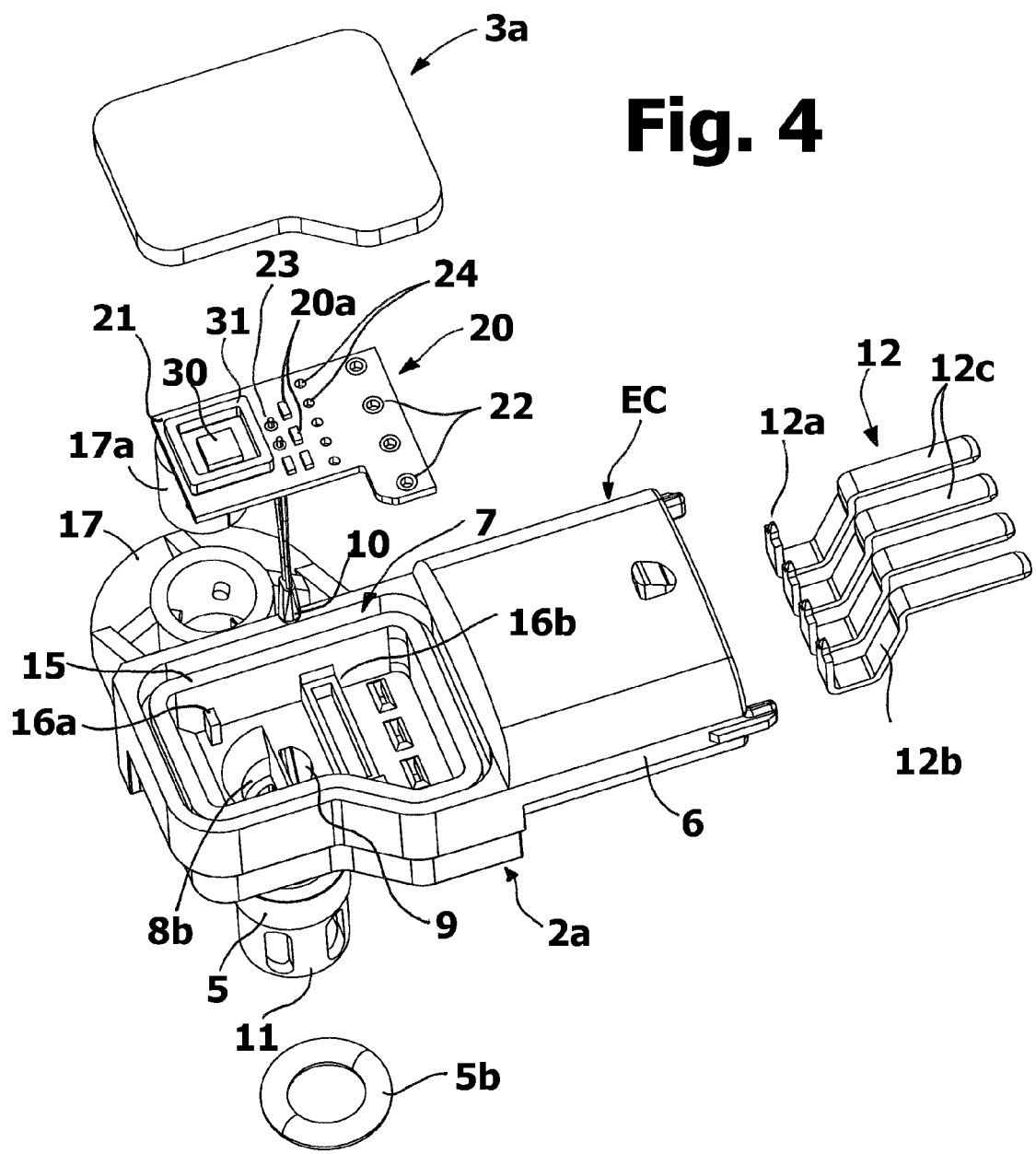
Figure 5:
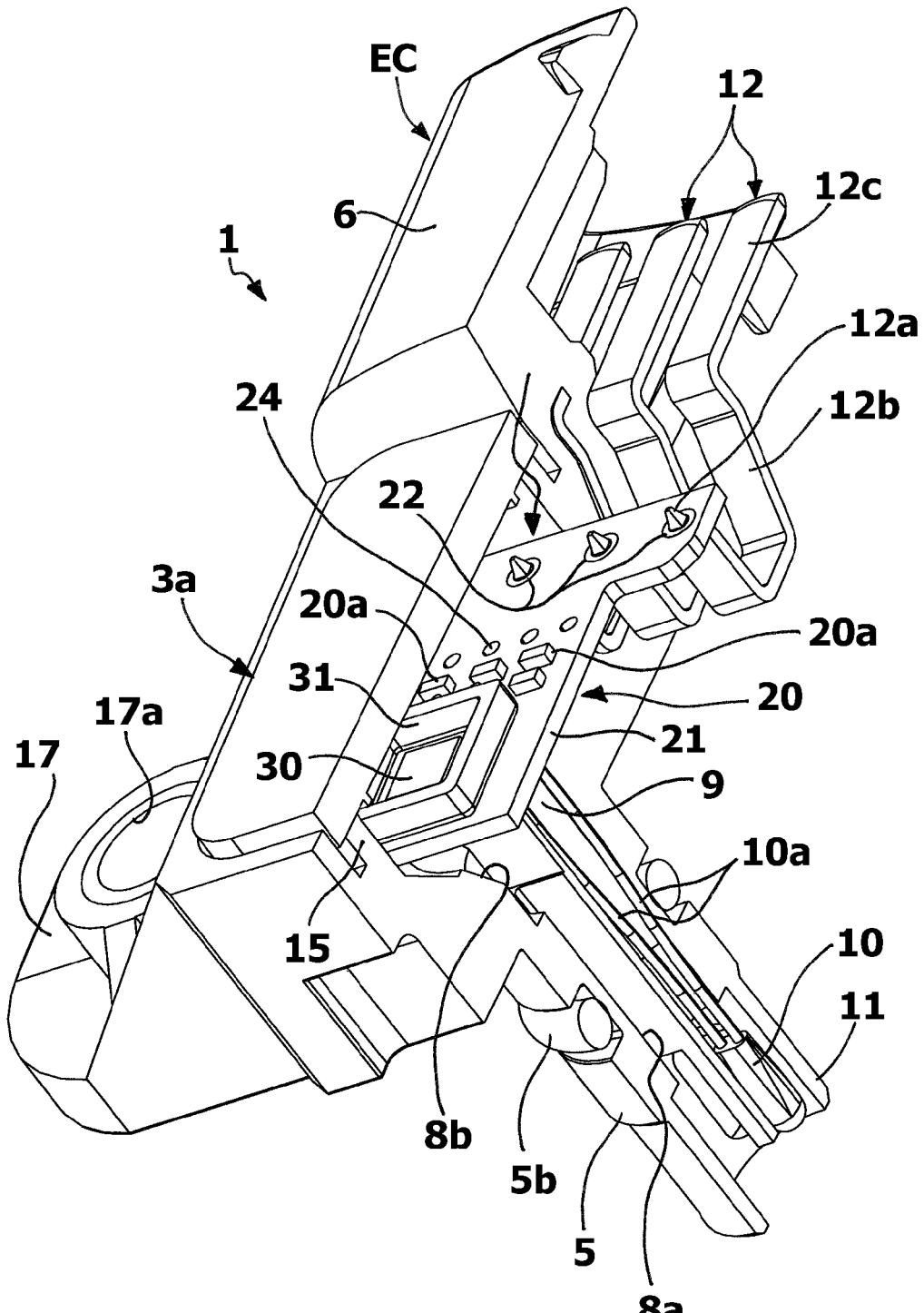
FIG. 5 is a perspective view in partial section of the device of FIGS. 1 and 2, in enlarged scale.
Figure 6:
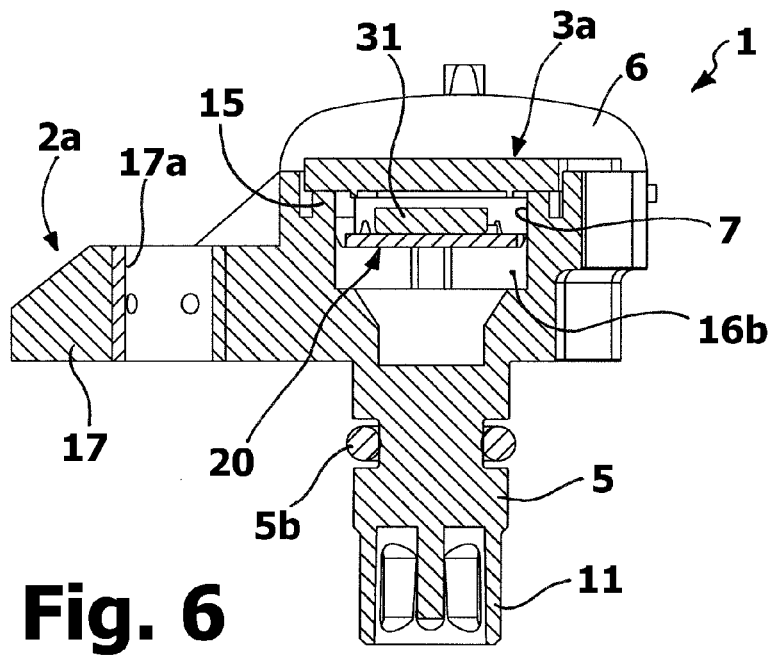
FIG. 6 is a view in transverse section of the device of FIGS. 1 and 2.

The circuit 20 comprises a circuit support or board, indicated with 21 in FIGS. 3-5, made of electrically insulating material, such as ceramic or fibreglass material, provided with electrically conductive tracks, not represented herein but of a per se known type. In the illustrated example the circuit includes electronic components, some of which are indicated with 20a, for example for the amplification and/or treatment and/or processing and/or conditioning of signals detected by the pressure sensor 30 and/or by the temperature sensor 10. Regarding this, it should be observed that the pressure sensor employed in the various embodiments described herein and/or the respective circuit 20 may be configured with the aim of allowing to programme the operation and/or detection parameters, comprising means for memorising and/or processing data. In addition, in other embodiments, the board 21 may be free of electronic components 20a, in such case the circuit 20 having the sole function of electrical connection, through the abovementioned conductive tracks, between the sensor means 10, 30 of the device and the terminals 12. The circuit layout, the electrical and/or electronic components possibly present and any control logic provided for the circuit 20 may be of any type per se known in the art, and hence are not described herein.

Some of the conductive tracks present on the board 21 terminate, at a respective end, at first connection holes 22 and second connection holes 23 made as through holes in the board 21, at such holes, the abovementioned tracks preferably being pad or ring or bushing shaped, so as to surround the holes themselves or cover surfaces delimiting them. The holes 22 and 23 are provided for the connection, through coupling and/or welding, of the ends 12a of the terminals 12 and of the rheophores 10a, respectively. Also made in the terminal board 21, preferably in positions not occupied by the conductive tracks, are through holes 24, whose purpose shall be explained hereinafter.

As mentioned, defined in the body 2a is a main cavity or chamber 7, open at the bottom of which are two passages 8a-8b and 9, defined axially in the connection portion 5. In the illustrated example the lower section 8a of the passage intended to supply to the chamber 7 the aeriform to be subjected to pressure measurement has a constant cross-section, substantially semicircular, extended into the connection portion 5; on the contrary, the second section 8b has a variable cross-section, generally flared, which is open at the bottom of the chamber 7, also having a substantially semicircular cross-section; also the passage 9, intended to accommodate the rheophores 10a of the temperature sensor 10, has a substantially semicircular cross-section in the illustrated example.

Defined in the chamber 7 is a support surface for the body or cover 3a. In the example, the abovementioned support surface is defined by the upper end of a peripheral wall 15 and provided in the region circumscribed by this wall, on the bottom of the chamber 7, are supports for the printed circuit board 20. First support projections, one of which is indicated with 16a in FIG. 4, are provided in proximity to a longitudinal edge of the chamber 7. A second projection, indicated with 16b, is transversely extended to the chamber 7, in an intermediate region thereof, and it is substantially hollow or tubular shaped.

As already mentioned, with the aim of obtaining the device 1, the material forming the body 2a, preferably thermoplastic material obtainable through injection moulding, is overmoulded to the terminals 12, in such a manner that the ends 12a of the terminals themselves are substantially extended vertically in the chamber 7, as observable for example in FIG. 5, in proximity to the end of the chamber opposite to the support projections 16a of FIG. 4. In the illustrated example, the material that forms body 2a is also overmoulded to a metal bushing 17a, to form a support element 17 for anchoring device 1 therewith.

The circuit 20 already assembled and provided with sensors 10 and 30 is positioned in the chamber 7, in such a manner that the board 21 settles on the respective supports 16a, and possibly 16b, with the rheophores 10a and the sensor 10 inserted through the passage 9. In the assembled condition, the through holes 24 of the board 21 face inside the cavity of the projection 16b, or at its right side (with reference to FIG. 4); such holes 24 may advantageously serve to inject a sealing material, such as a synthetic resin, in the region beneath the circuit 20, and in particular in the zone of the chamber 7 into which portions of the terminals 12 are extended: the projection 16b may conveniently be configured for such purpose, for example by delimiting a special region and/or providing for suitable passages or slots into its right wall (still with reference to FIG. 4), or in the wall facing the terminals 12.

After the described positioning, inserted or fitted into the connection holes 22 of the terminal board 21 are the ends with restricted or sharp pointed sections of the portions 12a of the terminals 12, as observable in FIG. 5, and the lower face of the terminal board 21 lies on the abutment surfaces 12a' (FIG. 3) of the terminals 12, which thus contribute to support the circuit 20. The ends 12a of the terminals may thus be welded to the conductive tracks of the circuit 20, at the holes 22, on the upper part of the board. Possibly applied on the ends 12a of the terminals welded to the circuit 20, and also on the ends of the rheophores 10a welded at the holes 23, is a material, such as a synthetic resin, for protection against oxidation and/or corrosions. The chamber 7 is thus closed by fixing the cover or body 3a, which lies—at the upper part—on the peripheral wall 15, as observable for example in FIGS. 5 and 6. The coupling between the bodies 2a and 3a may be obtained through any known technique, for example by welding the two bodies to each other (laser welding or welding by hot remelting of part of the bodies or vibration welding or ultrasound welding, etcetera), or by fixing an adhesive or sealing material between the two bodies, or still by mechanically deforming one of the two bodies (preferably when made of metal material) with respect to the other, with possible interposition of a gasket, etcetera. Coupling techniques of this type are useable in all embodiments described herein.

In a possible embodiment, for example, the bodies 2a and 3a are made of materials suitable to allow laser welding. For this purpose the bodies 2a and 3a may be made using material transparent and opaque to the welding laser beam, respectively, or vice versa; in such manner, upon contact from the laser beam, the material of the opaque body, for example the body 3a, is heated locally, until it melts and thus welds against the transparent body, for example the body 2a, passed through by the beam without being heated. Obviously, such technique may also be used in the other embodiments of the device described herein, as well as for fixing different parts of the device to each other, or for welding differently, for example in the joint region of both opaque materials. In a further possible embodiment, the bodies 2a and 3a may be made of materials and shapes adapted to allow welding through hot remelting or through ultrasound or vibration welding.

The device 1 illustrated in FIGS. 1-6 is preferably intended for the detection of the pressure of aeriform medium. Under normal conditions of use, the device 1 is connected to a line of the fluid subjected to control, through the connection portion 5 fitted, for example, in a pipe of the fluid in question, and in this manner also the temperature sensor 10 is exposed to the fluid, which fills the pipes 8a-8b and 9; thus, a signal or resistance value representing the temperature of the fluid is generated to the rheophores 10a of the sensor 10.

The fluid aeriform medium invades the entire chamber 7, also in the part above terminal board 21 of the circuit 20, wherein the sensor 30 is mounted, i.e. at the opposite part with respect to the inlet 8a-8b and to the temperature sensor 10. As mentioned, preferably provided for are protection resin depositions in the region in which the portions 12a of the terminals 12 face into the chamber 6, on the ends of the terminals 12 welded to the printed circuit board and on the ends of the rheophores 10a of the temperature sensor 10.

Through the configuration shown, the fluid aeriform medium may reach the chamber 7 also through the passage 9, when such passage and the respective sensor 10 are provided for in the device. The illustrated structure may in any case be easily modified with the aim of obtaining a device for detecting pressure and/or temperature of a liquid, for example providing for suitable seals (for example adopting an assembly circuits 20—sensor 30 of the type illustrated in the subsequent embodiment, with a casing of the sensor provided with a respective gasket that serves to seal the section of the passage 8b, suitably shaped for the purpose, and with a resin deposition for sealing the rheophores wires 10a inside the conduit 9).

In the chamber 7 the pressure of the fluid exerts pressure on a membrane portion of the sensor 30, causing flexure or deformation thereof, which generates on the terminals of the sensor itself a signal representing the value of the pressure of the fluid. Through the conductive tracks of the board 21, the signals representing pressure and temperature, possibly amplified and/or treated and/or processed in a per se known manner by electronic components 20a of the circuit 20, reach the terminals 12 of the device 1, which are electrically coupled to an external wiring, not represented, connected to a suitable external control unit, such as an electronic control unit of a vehicle (for example a fuel injection control unit or a nitrogen oxide emission control unit), or a control circuit of a domestic appliance or a control unit of an appliance or system for heating or conditioning air or fluids, such as a boiler.

As observable, through the described configuration, the terminals 12 of the device 1 are connected directly to the circuit 20, without the interposition of special connection elements. The solution of FIGS. 1-6 thus facilitates manufacturing of the device, whose casing 2a-3a is for the most part obtainable through a single operation of moulding thermoplastic material on the terminals 12 and on the bushing 17a, where provided for, and the circuit 20, previously provided with sensors 10 and 30, may be positioned by means of a simple linear movement in the cavity 7, with the ends 12a of the terminals 12 also serving In this step as elements for positioning the printed circuit board 30. The process is thus easily automatable, even regarding carrying out operations for welding the terminals to the circuit and the possible application of the resin for protecting the terminals themselves or other internal electric connection parts to the chamber 7.

FIGS. 7-10 show a second inventive embodiment of a sensor device. Reference numbers of FIGS. 1-6 are used in these figures to indicate elements technically equivalent to those already described and illustrated.

The embodiment of FIGS. 7-10 is for the most part similar to that of FIGS. 1-6, but in this case the device is configured in such a manner to allow detection of the pressure of liquid mediums. Also in this embodiment the pressure sensor is preferably of the silicon type and, in the illustrated non-limiting example, the device comprises a temperature sensor 10, though this is not to be considered an essential element of the invention, just like in the case of the preceding embodiment.

Figure 8:
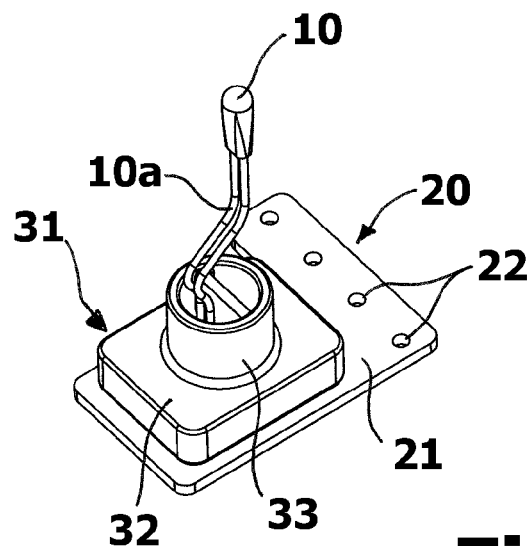
FIGS. 8 and 9 are views, respectively perspective and partially exploded, of an assembly of the device of FIG. 7.
Figure 9:
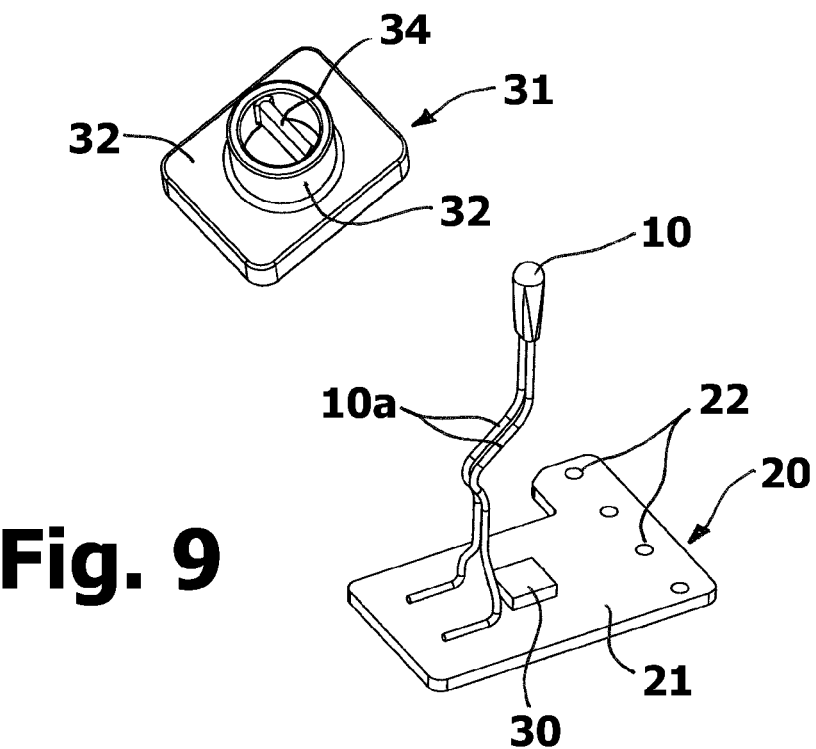

Also in this case, as observable in FIG. 9, the pressure sensor 30 is preferably mounted directly on a face of the terminal board 21, and the rheophores 10a of the temperature sensor 10 are welded on the same face. In this embodiment, the rheophores 10a have a connection section substantially lying or resting on the surface of the respective conductive tracks of the board 21, not represented, and hence without requiring providing for special holes in the board (like the holes 23 of the preceding embodiment); a "surface mounting" (SMD) on the board 21 is thus carried out for said sensors 30 and 10. The pressure sensor 30 is in this case provided with a protection casing, indicated with 31, axially hollow and open at the two ends, also fixed to the board 21 and made for example of thermoplastic material. As observable in the FIGS. 8 and 9, the casing 31 has a prismatic base part 32, substantially parallelepiped-shaped herein, rising from which is a substantially cylindrical part 33, the latter being internally provided with a transverse septum 34. The part 33 is substantially cylindrical-shaped in order to facilitate the coupling or sealing mounting with respect to a gasket, such as an o-ring; the casing 31 and/or the parts 32 and 33 could however be shaped differently, preferably with a profile at least partially curved and/or with rounded corners, so as to ensure a sealing coupling with respective gaskets or seal elements.

Figure 7:
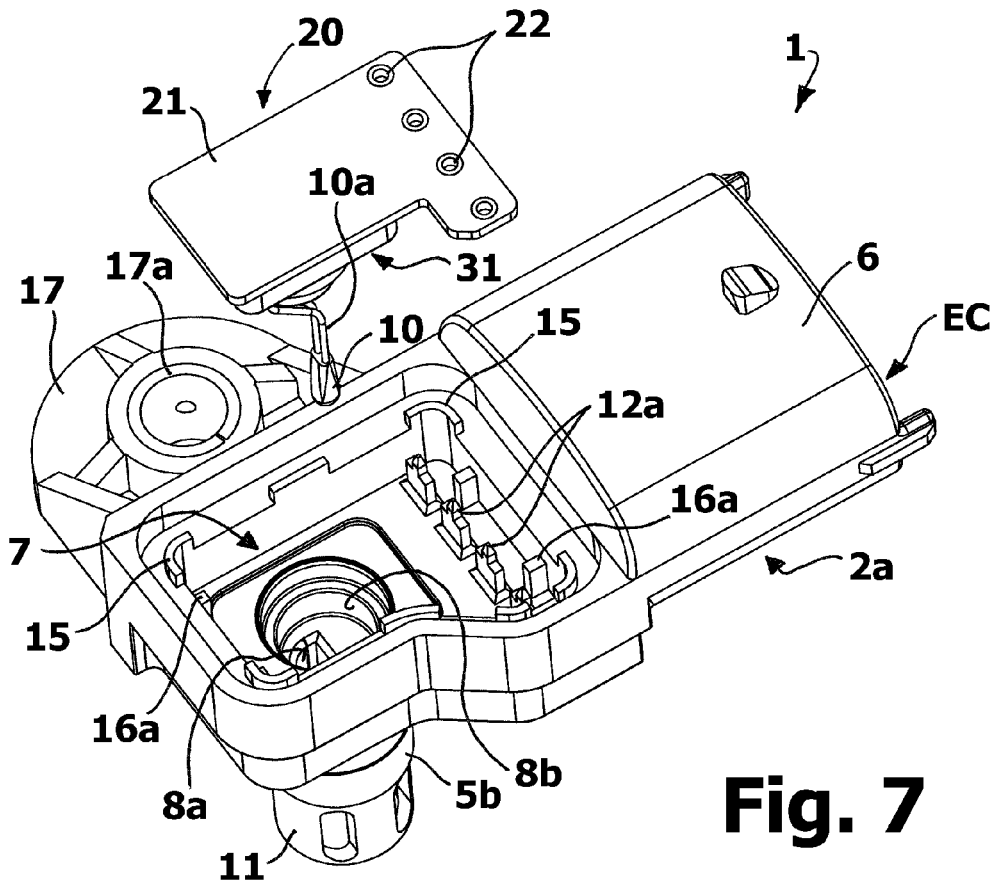
FIG. 7 is a partially exploded perspective view of a pressure sensor device according to a second inventive embodiment.
Figure 10:
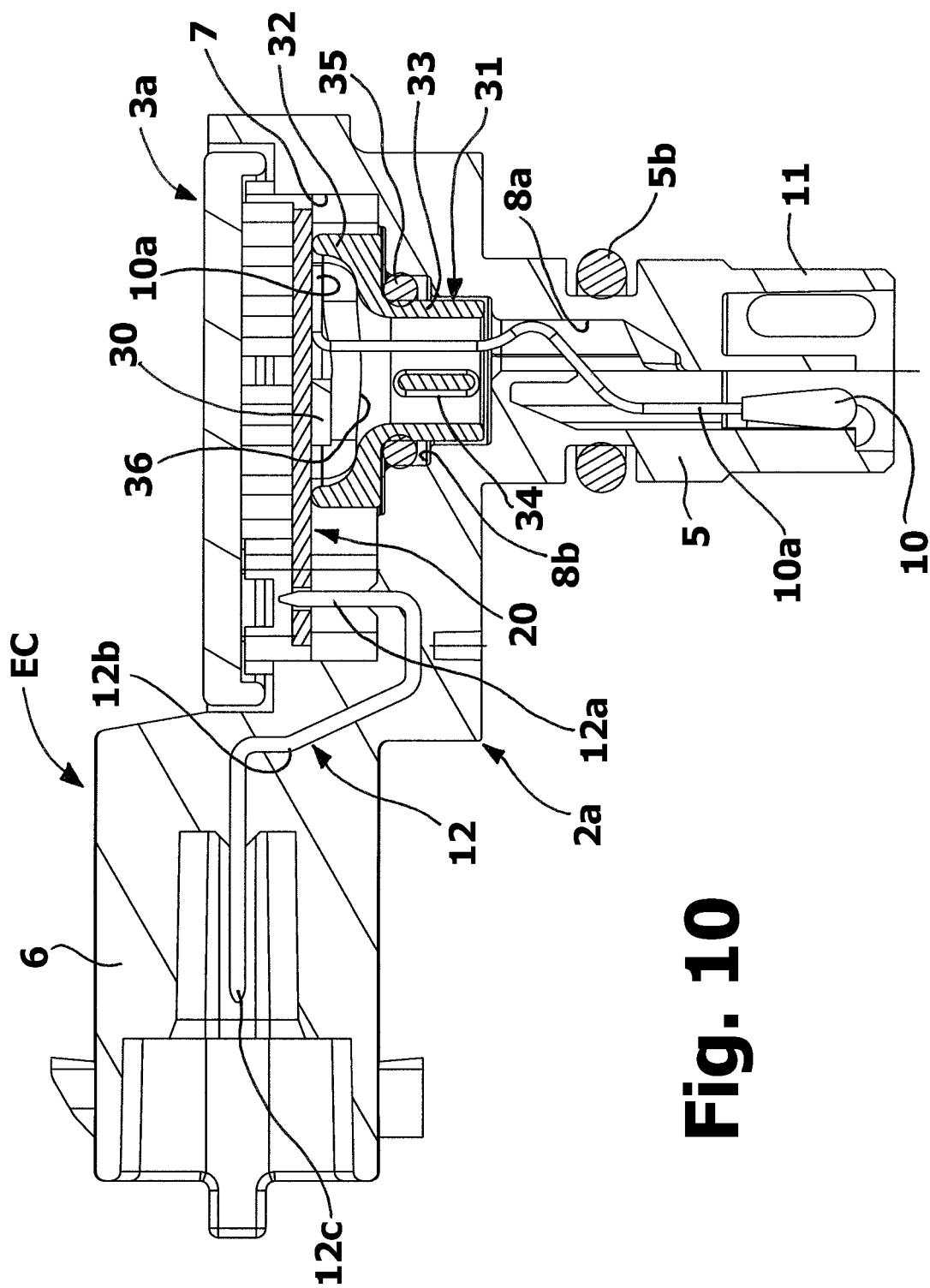
FIG. 10 is a transverse section of the device of FIG. 7.
Figure 11:
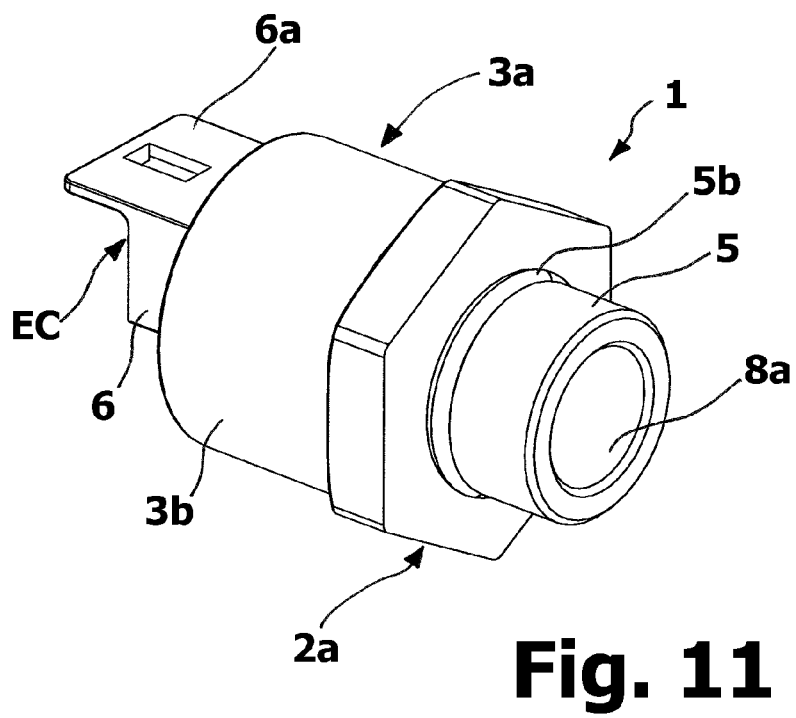
FIGS. 11 and 12 are perspective views, from different angles, of a pressure sensor device according to a third inventive embodiment.
Figure 12:
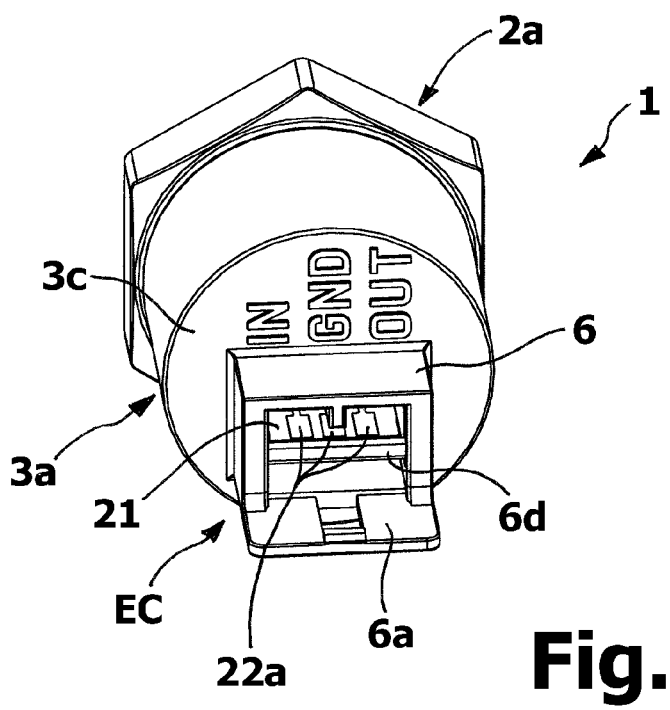

In FIG. 10 it is observable how, in this embodiment, the connection portion 5 comprises a single conduit, whose lower section 8a is in turn divided into two parts axially offset but connected, to define a sort of an uneven or S-shaped path, so as to prevent penetration of dirt. The conduit section 8b, that opens in the chamber 6, is cylindrical-shaped, suitable to receive the part 33 of the casing 31 of the pressure sensor. Mounted in the assembled condition of the device, in the joint region between the two parts 32 and 33 of the casing 31 is a radial seal element, such as an o-ring gasket indicated with 35 in FIG. 10, and the rheophores 10a are shaped in such a manner to pass through the casing 31 and the S-shaped path formed by the conduit section 8a. As observable in FIG. 7, also in this embodiment, projecting in the chamber 7 of the main body 2a are the end portions 12a of the terminals 12, which can be connected directly to the circuit 20 through the holes 22 of the respective board 21 (FIGS. 7-9). As observable in FIG. 7, provided for in the chamber 7 are projections 16a for supporting the board 21 and projections 15 for supporting the body or cover 3a, represented only in FIG. 10.

Also in this embodiment, after mounting the sensitive element 30 and the respective casing 31 on the board 21, preferably within the casing 31 is poured a protective material, such as gel of the type indicated previously, which covers the sensitive element. This protective gel, indicated with 36 in FIG. 10 is adapted to transmit the pressure of the fluid subject of measurement on the sensitive element 30, simultaneously insulating it from the fluid. Advantageously, in this embodiment, the casing 31—and specifically its base part 32—is configured to enclose also the part of the rheophores 10a connected to the circuit, as clearly observable in FIGS. 8 and 10: in this manner, the same gel 36 insulates and protects also the welding region of the rheophores 10a of the temperature sensor 10 on the board 21 from the fluid.

The embodiment of FIGS. 7-10 allows obtaining the same advantages of the embodiment of FIGS. 1-6, regarding simplification of the operations of making and mounting the device 1. Providing for the protection casing 31, preferably having at least one portion or profile at least partially curved or cylindrical, allows easily obtaining hydraulic sealing and/or an insulation of the circuit 20 and of the components mounted thereon with respect to the fluid, such as to prevent oxidation or other risks of chemical attack.

FIGS. 11-17 illustrate a further inventive embodiment of a device provided with a pressure sensor, preferably of the type made of silicon. Also in these figures, the reference numbers of the preceding figures are used to indicate elements technically equivalent to the ones already described.

In this embodiment the bodies 2a and 3a are modified with respect to the previous versions, in order to allow a different positioning and mounting of the circuit 20 and of the respective pressure sensor 30. The device 1 has, as a whole, an axial development, with the hydraulic connection part and the electrical connection part being at opposite ends of the device 1. Thus, in this embodiment, the connector EC is hence defined, at least partially by the body 3a. In the example, the body 3a has a mainly hollow cylindrical part, defined by a peripheral wall 3b and a bottom wall 3c; axially projecting from such bottom wall 3c, outwards the body 3a, is a tubular portion 6 of the connector EC.

As observable particularly in FIGS. 13 and 14 the circuit 20 has the board 21 made of insulated material, provided on which are conductive tracks 21a with respective end pads 22a: in this embodiment, the tracks 21a, or their pads 22a, are intended to obtain with the board 31 part of the connector EC for the electric connection of the device 1.

The silicon pressure sensor is not observable in the figures, but it is conceived in a manner analogous to that of the embodiments of FIGS. 1-10, it is mounted directly on the board 21 and it is provided with a respective protective casing, indicated with 31, for example made of moulded plastic material. As observable in FIG. 14, in this case also the base part 32 of the casing 31 is substantially cylindrical shaped; defined between the parts 32 and 33 of the casing 31 is a step or surface seat, for positioning a respective radial seal element 35, preferably made up of an o-ring gasket; in other embodiments not represented, and depending on the selected geometries of the parts coupled together, the seal element 35 may be replaced by an axial seal element or by an element capable of exerting both an axial sealing and a radial sealing (in such case, the axial or axial-radial seal element must not necessarily be coaxial or centred with respect to the axis of the pressure sensor). In the example, the board 21 has, at the mounting region of the pressure sensor, a through hole 24a for ventilating and/or for allowing the sensor itself to have a reference environmental pressure. Also in the embodiment of FIGS. 11-17 inside the casing 31 may be provided a material for protecting the pressure sensitive element mounted on the board 21, such as a gel of the type indicated previously, or there can be provided with variants of the form of casing 31, however adapted to guarantee suitable sealing.

Figure 15:
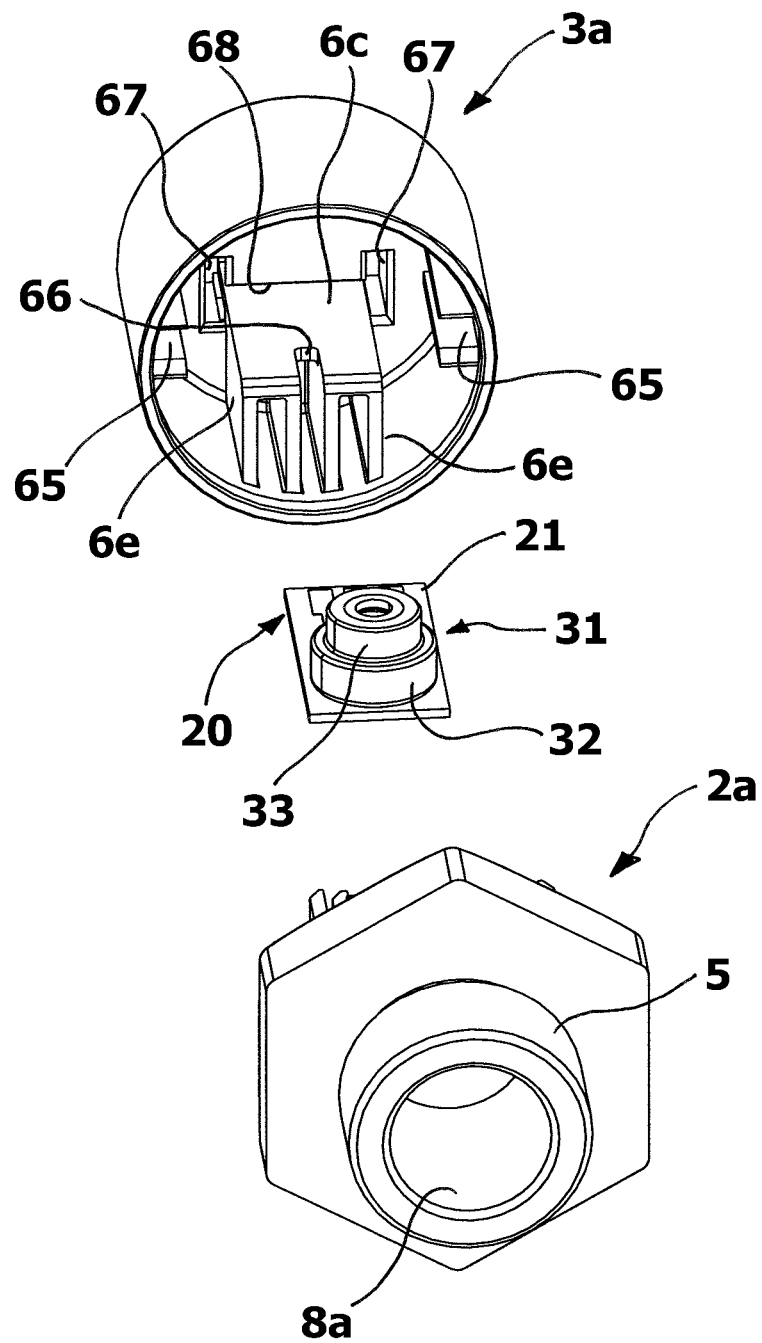
Figure 16:
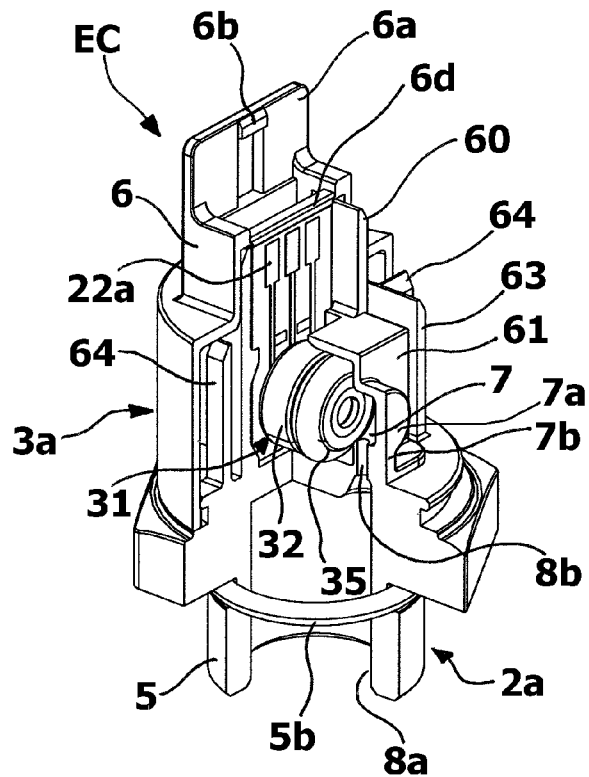
FIG. 16 is a perspective view in partial section of the device of FIGS. 11 and 12.

Still with particular reference to FIGS. 14 and 15, the portion 4 of the body 2a has a base central part 4a, substantially circular-shaped in this case, defining a peripheral seat 4b for a gasket 4c, intended to sealingly cooperate with the peripheral wall 3b of the body 3a. Rising from said base central part 4a are the first uprights 60, preferably having generally sharp-pointed ends, or comprising at least one tilted plane. Formed between the two uprights 60 is a body part 61 defining the cavity or chamber 7 for accommodating the pressure sensor 30, or at least part of the respective casing 31; in particular, the chamber 7 comprises at least one portion extended along an angled axis, preferably orthogonal or radial, with respect to the axis of the connection portion 5 and/or with respect to the main axis of the device 1 and/or with respect to the axis of the tubular portion 6 belonging to the electric connector EC of the device.

In the illustrated non-limiting example the body part 61 has, on the side opposite to the inlet of the chamber 7, a cup-shaped region or having restricted section, indicated with 7a only in FIG. 14, which defines a bottom portion of the chamber itself, as well as a conduit formation 7b that communicates the internal of the abovementioned bottom portion 7a with the conduit section 8a, extended axially inside the connection portion 5 of the body 2a. As observable particularly in FIGS. 16 and 17, the conduit formation 7b thus forms a conduit section 8b, which allows the fluid to reach into the chamber 7, for the purposes of pressure detection carried out by the pressure sensor.

Provided between the uprights 60 and the body part 61, in a peripheral position at the inlet of the chamber 7, are projections for supporting the printed circuit board 20, some observable in FIG. 13, where they are indicated with 62. Provided for beside the uprights 60 are two second uprights or walls 63, shorter with respect to the uprights 60; present on the surface of the uprights 63 external with respect to the uprights 60, is a projection 64, preferably an axial projection having a generally sharp-pointed end, just like the uprights 60.

Figure 17:
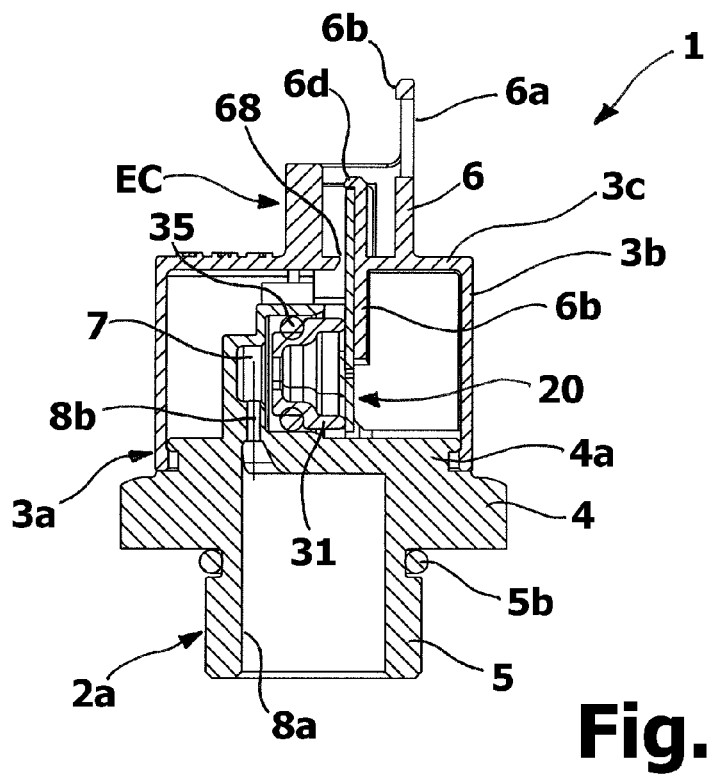
FIG. 17 is a view in transverse section of the device of FIGS. 11 and 12.

The tubular portion 6 of the body 3a has a quadrangular section, with a projecting wall portion 6a provided with a tooth 6b (see for example FIG. 14), and extended inside the portion 6 is a wall 6c with a respective end step 6d (see for example FIG. 17).

Provided in the cavity of the body 3a are lateral axial guides, indicated with 65 in FIG. 15, intended to cooperate with the projections 64 of the body 2a, in particular with the aim of ensuring proper positioning of the body 2a with respect to the body 3a. Furthermore, from FIGS. 15 and 17 it is observable that the intermediate wall 6c projects also inside the cavity of the body 3a, so as to provide a support for the circuit 20; for this purpose the portion of the wall 6c projecting inside the cavity of the body 3a is conveniently supported through ribs or projections 6e defined in at least one of the bottom wall 3c and the circumferential wall 3b of the body 3a. Furthermore, in the illustrated example, the wall 6c has a central passage, herein in form of a slot, indicated with 66 in FIG. 15, at which the hole 24a (see FIG. 13) of the board 21 of the circuit 20 is intended to face. Made in the bottom wall 3c of the body 3a are two openings, indicated with 67 in FIG. 15, intended to receive the ends of the uprights 60; formed between these openings 67, still in the bottom wall 3c, is a transverse slot indicated with 68 in FIGS. 15 and 17, partially delimited by the wall 6c, for the passage of a portion of the circuit 20 outside the cavity of the body 3a.

With the aim of mounting the device, mounted on the casing 31 of the pressure sensor is a gasket 35, and the circuit 20 is positioned between the uprights 60, in such a manner that said casing 31 is inserted at least partially into the chamber 7 and the terminal board 21 lies on the suitable projections 62 of FIG. 13. The body 2a provided with the circuit 20 is thus inserted into the body 3a, with the projections 64 of the uprights 63 (FIGS. 13-14) engaged in the guides 65 of the body 3a (FIG. 15). The body 2a is pushed into the cavity of the body 3a until the ends of the uprights 60 fit into the passages 67 of the bottom wall 3c: in this step, a portion of the circuit 20 passes through the slot 68 (see FIG. 17) and the end of the circuit itself, where the pads 22a are located, settles on the step 6d formed by the end of the intermediate wall 6c, outside the cavity of the body 3a, as observable for example in FIGS. 16 and 17. In this manner, the part of the circuit 20 that is accommodated in the tubular portion 6 of the body 3a actually forms a generally flat-shaped connector, and particularly a male connector for printed circuit boards, for example made of FR4 material, suitable to be connected to a female connector of the same type.

It should be observed that the portion of the intermediate wall 6c projecting into the tubular portion 6 of the electric connector EC, alongside said end portion or step 6d, allow transforming the connector provided by the terminal board 21 and by the pads 22a of the circuit 20 into a different electric connector, substantially having the same structure but greater thickness; furthermore, the wall 6c provides a support that reinforces the board or printed circuit support 21, which is preferably made of ceramic material or using fibreglass and/or with a reduced thickness, like in the other embodiments described herein.

As mentioned, in this embodiment, the axis of the chamber 7 is substantially orthogonal to the axis of the connection portion 5 of the device and/or the axis of the cavity of the body 3a.

Also this embodiment allows facilitating the manipulation of components and assembly of the device, obtainable through simple linear movements and/or allows obtaining a device 1 with a definitely protected and reinforced circuit 20. The solution in question considerably simplifies manufacturing of the connector of the device, obtained directly from the circuit 20, and further allows transforming the connector of the circuit 20 from a first type (thinner) into a second type (thicker), though of the same type, for example to allow the connection with an external electric connector of different type, or for transforming the connector of the circuit 20 from a first delicate type into a second more reinforced type. It should be noticed that, for particular applications, such as the use in motor vehicles, the device of FIGS. 11-17 may be provided with a connector having a different configuration than the represented one, having a plurality of terminals, for example being similar to the connector of FIGS. 1-10, and thus comprising a tubular body part within which a plurality of terminals connected to the circuit 20 project.

In a possible variant, for instance for use of the device of FIGS. 11-17 on motor vehicles, within at least one of the conduit sections 8a, 8b, and particularly the section 8a, a compensation element may be mounted, to be in contact with the fluid subjected to measurement and formed of an elastic or compressible material, whose deformation can compensate possible pressure peaks and volume variations of the fluid, for instance in case of freezing thereof. The body of said compensation element is preferably formed of a spongy or expanded material, preferably being of impermeable type with closed cells, such as EPDM or silicone. The body of the compensation element can anyway be formed in a different manner, for example with an elastic material having a compressible inner chamber or portion. The compensation element may have for example a generally tubular shape, preferably but not necessarily a cylindrical shape, with a through hole for allowing the fluid passage; in case the compensation element substantially wholly occupies the first conduit section 8a, the above said hole is anyway in fluid communication or connected with the second conduit section 8b, for example by providing for also a radial conduit portion in the compensation element or in the body 2a; in other embodiments the compensation element may not occupy completely the conduit section 8a, thus leaving a connection gap or a conduit portion free in proximity of the conduit section 8b. Clearly, one or more compensation elements of the type referred to may be used also in the devices according to FIGS. 1-10.

Characteristics and advantages of the invention are apparent from the description, mainly represented by the simplicity of manufacture and mounting of the various devices described, as well as the increased protection characteristics of the active components of the system, such as the pressure sensor, or of critical connection regions, such as the connection of the terminals 12, rheophores 10a, and the same sensor 30 to the circuit 20. In the various configurations, the terminals of the electric connector EC of the device are connected directly to the circuit 20, without interposition of special connection elements, or they are obtained directly from the circuit 20.

It should also be observed that the described sensor devices may be used as devices for measuring the pressure generated by a liquid head, for example for measuring the level of a liquid inside a tank. In such use, the sensor device may be arranged in proximity to the bottom of the tank and hence measuring the height of the liquid present in the tank by simply measuring the pressure generated thereby, by knowing the density of the liquid.

It is clear that various variants are possible for the pressure sensor devices described for exemplification purposes, without departing from the scope of the invention as defined in the claims that follow. It is also clear to the man skilled in the art that the characteristics described and illustrated with reference to a specific embodiment can also be used in other embodiments described, i.e. that the characteristics of various embodiments are variously combinable, also to obtain devices different from the ones shown for exemplification purposes.

The sensor device according to the invention may be provided with means for shielding against problems due to electromagnetic interference (EMI). These means may advantageously be obtained by means of a layer of electrically conductive material, deposited on the internal surface of the chamber 7 (in case of the embodiments of FIGS. 1-6 and 7-10) or of the cavity of the body 3a (in case of the embodiment of FIGS. 11-17), excluding some regions, and specifically regions exposed to the risk of short-circuiting and possible regions in which aeration spaces are provided for. Preferably, the abovementioned layer is however positioned at contact with a terminal 12 electrically connected to an electric potential suitable to obtain the abovementioned shielding, preferably a ground or earth potential.

The material forming the abovementioned layer may be conveniently in form of paint, ink, paste or electrically conductive plastic; with the aim of depositing the material, in the production step it is preferable to use suitable equipment, such as for example a mask configured in such a manner to have the parts that cover the regions in which the presence of the layer should be avoided and parts open at regions in which the layer must be present. The layer in question may be moulded or overmoulded to the body 2a or 3a, instead of being deposited thereonto in form of paint, ink or paste; provided for such purpose are suitable moulds and/or moulding equipment. In case of shielding against interferences obtained through moulding, electrically conductive thermoplastic material is preferably used; said electrically conductive thermoplastic material could also partially form part of the casing of the device according to the invention.

In case of a device provided with a temperature sensor, the latter could be mounted directly on the printed circuit board 20, in a manner similar to the case of the pressure sensor 30, or be of the surface mounting type (SMD type). Advantageously, in this case, both sensors could be enclosed in the casing 31 and covered by the protection material or gel indicated previously.

It is possible to provide for that the transmission of data between the device according to the invention and a respective control unit may occur through wireless transmission, for example using radiofrequencies: in such case the device incorporates, alongside the circuit 20 for possible processing of the signal, also a transmitter circuit and a battery or a power supply circuit.

Reference to a given "embodiment" in this description indicates that a particular configuration, structure or characteristic described regarding the embodiment is included in at least one inventive embodiment. Hence, the expression "embodiment", possibly present in various parts of this description does not necessarily refer to the same embodiment. Furthermore, particular configurations, structures or characteristics may be combined in any suitable manner in one or more embodiments.

The invention claimed is:

1. A pressure sensor device comprising:
a casing defining a cavity with an inlet passage,
a pressure sensor having a body accommodated in the cavity, for detecting the pressure of a fluid present in the inlet passage,
a circuit arrangement including a circuit support at least partially accommodated in the cavity according to a respective laying plane, the pressure sensor being mounted on the circuit support,
wherein associated to the circuit support is a protection body surrounding the pressure sensor and cooperating for sealing purposes with an internal surface of the casing, and
wherein the protection body has at least one respective portion inserted into the inlet passage.

2. The device according to claim 1, wherein the protection body cooperates with said internal surface of the casing through seal means.

3. The device according to claim 2, wherein the protection body externally defines a seat for coupling or positioning a seal member belonging to said seal means.

4. The device according to claim 2, wherein the inlet passage comprises a chamber defined within the cavity, and
the protection body has at least one respective portion inserted into the chamber and the seal means cooperate with a surface delimiting the chamber.

5. The device according to claim 4, wherein
the casing comprises a first casing part and a second casing part mutually couplable according to a coupling direction to define the cavity therebetween,
the chamber for the pressure sensor is entirely defined in the first casing part and is extended in a respective axial direction that is substantially perpendicular to said coupling direction and to the laying plane of the circuit support.

6. The device according to claim 5, wherein the first and the second casing part define respective positioning elements configured to maintain the circuit support in the respective laying plane, with a respective portion of the circuit support outside the cavity.

7. The device according to claim 6, wherein the portion of the circuit support outside the cavity forms at least part of an electric connector belonging to the circuit arrangement.

8. The device according to claim 1, wherein defined within the cavity is a chamber for the pressure sensor, in fluid communication with the inlet passage and extending in an axial direction which is substantially perpendicular to the axial direction of at least one section of the inlet passage.

9. The device according to claim 1, wherein
the protection body externally defines a seat for coupling or positioning a seal member, and
the seal member cooperates with a surface delimiting the inlet passage.

10. The device according to claim 1, further comprising a temperature sensor connected to the circuit support and wherein the protection body surrounds the pressure sensor and at least part of the temperature sensor.

11. The device according to claim 1, wherein the protection body is hollow and contains a protection material.

12. A pressure sensor device comprising:
a casing defining a cavity with an inlet passage,
a pressure sensor having a body accommodated in the cavity, for detecting the pressure of a fluid present in the inlet passage,
a circuit arrangement including a circuit support at least partially accommodated in the cavity according to a respective laying plane, the pressure sensor being mounted on the circuit support,
wherein associated to the circuit support is a protection body surrounding the pressure sensor and cooperating for sealing purposes with an internal surface of the casing, and
wherein the protection body is hollow and contains a gel.

13. A pressure sensor device comprising:
a casing defining a cavity with an inlet passage,
a pressure sensor having a body accommodated in the cavity, for detecting the pressure of a fluid present in the inlet passage,
a circuit arrangement including a circuit support at least partially accommodated in the cavity according to a respective laying plane, the pressure sensor being mounted on the circuit support,
the device comprising at least one of:
a temperature sensor and associated to the circuit support is a protection body surrounding the pressure sensor and at least part of the temperature sensor,
a first casing part and a second casing part mutually couplable according to a coupling direction to define the cavity therebetween, the pressure sensor being at least partially accommodated in a chamber defined inside the cavity, wherein the inlet passage is in communication with the chamber and the chamber accommodating the pressure sensor is entirely defined in the first casing part and is extended in a respective axial direction that is substantially perpendicular to said coupling direction and to the laying plane of the circuit support;
a first casing part and a second casing part mutually couplable according to a coupling direction to define the cavity therebetween, and the first and the second casing part define respective positioning means configured to maintain the circuit support in the respective laying plane, with a respective portion of the circuit support outside the cavity to obtain at least part of a connector belonging to the circuit arrangement, the pressure sensor being at least partially accommodated in a chamber defined inside the cavity, the inlet passage being in communication with said chamber;

a connector of a first type directly defined by the circuit support, the casing being configured to transform said connector into a connector of a different type;

a connector comprising connection terminals each having a first portion extended inside the cavity and a second portion extended outside the cavity, wherein the first portion of each terminal defines at least one abutment surface departing from which is a terminal end having a restricted section, particularly generally sharp-pointed, which is extended axially according to a direction at least approximately perpendicular with respect to the laying plane of the circuit support, wherein the restricted ends of the terminals are inserted into respective holes present in a first region of the circuit support, with the latter lying on the abutment surfaces, and wherein the casing defines, inside the cavity, positioning means for supporting the circuit support in a second region thereof.

14. The device according to claim 13, wherein the pressure sensor and the temperature sensor are mounted on a first face of the circuit support, the temperature sensor being enclosed at least partially, alongside the pressure sensor, by the protection body and covered by a protection material.

15. The device according to claim 13, wherein the temperature sensor has respective terminals longitudinally extended, having an end region electrically connected to the first face of the circuit support, said end region of the terminals of the temperature sensor being enclosed, alongside the pressure sensor, by the protection body and covered by the protection material.

16. The device according to claim 13, wherein the circuit support
comprises electrically conductive tracks and a portion of the circuit support bearing part of the electrically conductive tracks is extended outside the cavity to obtain part of an electric connector belonging to the circuit arrangement, and/or
is in an intermediate position with respect to the temperature sensor and to the pressure sensor.

17. The device according to claim 13, wherein the casing has at least one of
a hydraulic connection portion extended in which is at least one section of the inlet passage, further formed in the connection portion being a passage for the temperature sensor and/or for connection terminals thereof to the circuit support, and
a hydraulic connection portion extended in which is at least one section of the inlet passage, also extended in the inlet passage being at least part of the temperature sensor.

18. The device according to claim 13, further comprising a circuit for wireless transmission of signals.

19. A pressure sensor device comprising:
a casing defining a cavity with an inlet passage comprising a chamber defined in the cavity,
a pressure sensor having a body accommodated in the cavity, for detecting the pressure of a fluid present in the inlet passage,
a circuit arrangement including a circuit support at least partially accommodated in the cavity according to a respective laying plane, the pressure sensor being mounted on the circuit support,
a first casing part and a second casing part mutually couplable according to a coupling direction to define the cavity therebetween, the pressure sensor being at least partially accommodated in said chamber defined inside the cavity, said chamber axially extending in a direction that is substantially perpendicular to the coupling direction and to the laying plane of the circuit support,
wherein associated to the circuit support is a protection body surrounding the pressure sensor and cooperating for sealing purposes surface of the casing,
wherein the protection body has at least one respective portion inserted into said chamfer and externally defines a seat for coupling or positioning a seal member that cooperates with a surface delimiting said chamber.

20. The device according to claim 3, wherein said seal means is a radial seal gasket.

* * * * *

UNITED STATES PATENT AND TRADEMARK OFFICE
CERTIFICATE OF CORRECTION

PATENT NO. : 8,468,895 B2
APPLICATION NO. : 13/000292
DATED : June 25, 2013
INVENTOR(S) : Colombo et al.

It is certified that error appears in the above-identified patent and that said Letters Patent is hereby corrected as shown below:

In the Claims

Column 15, line 31, Claim 15, "claim 13" should read "claim 14";

Column 16, line 38, Claim 19, "chamfer" should read "chamber"; and

Column 16, line 42, Claim 20, "means" should read "member".

Signed and Sealed this
Thirtieth Day of September, 2014

Michelle K. Lee
*Deputy Director of the United States Patent and Trademark Office*